Dec. 13, 1955 V. RAKOWSKY 2,726,766
SEPARATION OF SOLIDS MIXTURES
Filed Aug. 14, 1951 3 Sheets-Sheet 1

INVENTOR
VICTOR RAKOWSKY,
BY
ATTORNEY

United States Patent Office 2,726,766
Patented Dec. 13, 1955

2,726,766

SEPARATION OF SOLIDS MIXTURES

Victor Rakowsky, Joplin, Mo.

Application August 14, 1951, Serial No. 241,722

10 Claims. (Cl. 209—211)

This invention relates to the separation of heterogeneous mixtures of solid particles into fractions which differ in specific gravity. As such, it contemplates both process and apparatus improvements for making these separations. More specifically, the invention is concerned with improvements in both method and apparatus for making density separations accomplished by treatment in a separatory fluid. Still more particularly, in the present invention, both methods and equipment are provided to accomplish separation at a density greater than that of the separatory fluid.

Cross reference is here made to applicant's copending applications for United States Letters Patent Serial Nos. 241,721, 241,723, 241,724, and 241,725, all filed of even date.

In the last several decades, industry has shown a markedly increasing interest in so-called "sink and float" separations of mixtures of solid particles. Industrial progress in this field has included the development of many different process and equipment improvements for the separation of particulate solids mixtures into fractions of differing specific gravity. Many acceptable and successful installations have been, and are being, built and operated. However, one feature, employed in all such processes and equipment is the immersion of the particulate mixture to be separated in some fluid in which the separation is accomplished.

This separatory fluid may take a number of different physical forms. In some cases, it is a true liquid or solution having a sufficiently heavy density. More commonly, however, it will be a heavy media separatory fluid, i. e., will comprise a suspension of solid "medium" or "media" particles in a liquid, usually water or an aqueous solution. Ordinarily, the medium solids are of a sufficient degree of fineness that the suspension for all practical purposes behaves as a true liquid of high density. It is with the use of such suspension-type separatory media that the present invention is primarily concerned. However, the principles developed in this invention can be employed equally well whatever type of medium it may be desirable to use.

The more common types of installation involve the establishment of a large "static" body of relatively quiescent separatory medium. Ancillary thereto are necessary and suitable provisions for maintaining substantially hydraulic equilibrium therein. The solids mixture to be separated is dropped into this body of medium. The lighter gravity fraction floats to the top and is removed, generally by overflowing. The heavier fraction sinks to the bottom and is removed by some suitable mechanical or hydraulic means.

While such systems are highly satisfactory in the results produced, they possess several inherent limitations. One, for example, is in the physical size and quantity of apparatus required. Successful operation on any reasonably large scale requires a large investment in the separatory apparatus and ancillary equipment. In addition, large inventories of medium in the system and in reserve are necessary. Another, is that such systems do not operate at their optimum efficiency when there is a wide variation in the size range to be handled. This can be overcome by suitable size-grading and preparation. However, to do so involves additional costs in labor, overhead and maintenance.

Too, the system loses economic efficiency in treating particles of average diameter below about one-quarter inch. The loss is very marked at particle sizes below about ten mesh, unless special equipment is provided for these smaller particles. Further, the inherently slower settling rates of the smaller particles reduces the capacity of a fixed-size apparatus. Alternatively, but more uneconomically, a multiplicity of units, each to handle a different size-range, may be used.

It is, therefore, a principal object of the present invention to devise a simple separatory method and unit which is less subject to these restrictions. They should not require as large apparatus to treat an equal amount of material. Further they should not be particularly sensitive to the presence of a wide range of particle sizes. Such a unit should be capable of handling mixtures of a size range at least as great as from two inch diameters down to about plus twenty mesh or of proportionate spread in other size ranges, both larger and smaller.

More recently, a modification of the quiescent zone usage has appeared. A similar, high-density, separatory fluid is used. It is caused to whirl in a small confined space at such high angular velocity that an open central vortex is created. The heavier material falls down the outer part of the containing vessel and the lighter, or float fractions rise up through the central vortex. The resultant rotary parting forces are largely independent of and in the order of magnitude of many times normal gravity. Such systems, where they can be used, are highly efficient.

However, such systems, too, are subject to several inherent limitations. While the actual separatory vessel in this process is relatively tiny, the installation is not. It requires an equal, if not greater, overhead for medium in circulation than does a "static" body system such as previously discussed. Often, the investment, overhead and operating expenses in and for the ancillary equipment is even greater than for a static system.

Further, such systems are of no practical utility except when small particles are to be handled. In general, these particles will never exceed these smaller size ranges at which "static" types of heavy-media separation lose their economic efficiency. Nor do these installations permit as wide a range of particle sizes to be treated in any one operation as might be desirable. Moreover, in any operation, whether of single or multiple units, large particles cannot be handled because the feed must be added to the separatory fluid before the introduction of either into the separatory vessel. This means that only material of a sufficiently small size to be passed through a pump at the necessary high velocity rate can be treated.

Moreover, for such systems to obtain a perfect separation, a vortex of a true circular shape must be created and maintained. This, in turn, is dependent upon the maintenance of a constant pressure of the incoming separatory fluid. When this pressure varies, as it commonly does because of continual pressure fluctuations in the ancillary equipment, the shape of the vortex in the separating vessel tends to be altered. For instance, such pressure fluctuations may cause the vortex to assume an elliptical rather than true circular shape. When this occurs, only a portion of the float fraction rising through the central vortex is free to escape through the circular exit port.

Other types of systems have been proposed. Some have been tried and used, even in large scale operations.

However, none of them have been free from most of the objections noted above in the static and high rotary velocity systems discussed.

It is, therefore, a still further object of the present invention to devise a separatory process and apparatus capable of handling, but not limited to, the treatment of small particles. However, they should avoid the large installation requirements of static separatory procedures. Such a process should not be limited to treatment of any particular maximum particle size. On the other hand, it is a further object, in order to decrease the size of the apparatus, to utilize separatory forces greater than those of the normal gravity utilized in static operations.

Removal of both the lighter-gravity and heavier-gravity product fractions from the separatory vessel, regardless of the system used, will involve also the removal of considerable quantities of separatory fluid. For economical operation, it is ordinarily necessary that a system employing heavy media provide for recovering and reusing the entrained medium solids. In general, both fractions are passed over a drainage screen, or some mechanical equivalent. So much of the separatory fluid as will drain from the solids is thus removed. Subsequently, any remaining separatory fluid is washed from the particles. So far as possible, these drainage-media and in some cases washings are returned directly for reuse.

Diluted washings, and usually any drainage medium not directly recycled, are sent to some dewatering system. Therein, the medium solids are freed from excess liquid. Some cleaning must also be done to prevent excessive losses in specific gravity due to recycling of permanent fines and slimes. When magnetic cleaning is used they are usually also demagnetized, at least to a considerable degree. Dewatered and/or cleaned solids are then made up into fluid medium of the requisite density and recycled, together with any necessary fresh medium, as makeup fluid.

In various industrial proposals for the making and use of suspension-type separatory fluids, many different kinds of medium particles have been used. Their nature will determine to some extent the type and extent of the cleaning required to remove permanent slimes and fines.

In some cases, a cheap solid, such as barytes, is used and the necessary cleaning is attempted by continuously discarding part of the medium and replacing it with fresh fluid. In other cases, for example, attempts are made, as by flotation, jigging, settling, or the like, to recover the medium solids content of the withdrawn fluid, thereby separating them from the more permanently suspended fines and slimes.

Industrially, however, a more important modification of these processes utilizes magnetizable medium solids. Finely-divided magnetite, ferrosilicon, crushed steel, roll scale, grinding dusts, etc., are made up into a separatory medium. However, such solids, being magnetically susceptible, may be recovered by magnetic cleaning, i. e., separated from the non-magnetic fines by magnetic forces.

Actually, in the present invention, the type of solids and the specific method used in recovering or cleaning them is not critical. The invention is applicable for use with any suitable recovery system. This is true, whether the separatory medium is a true liquid or a suspension-type "medium." If the medium is a suspension type, then so long as some suitable method of cleaning and recovering the medium solids is available, and the solids may be made up into fresh fluid of the proper density and recycled, the other advantages of the present invention may be obtained.

In general, the objects of the present invention have been successfully accomplished to a highly surprising degree. The separatory system used is a dynamic, rather than static one, in its operating principle. On the other hand, critical high angular velocities even remotely approaching those required to produce an inverted vortex whirl are neither needed nor used. The necessary separatory vessel is small in size compared to those of a normal "static" system. As compared with normal operation of known separators of equal treating capacity, the required volumes of separatory fluid are small. An overall system can be arranged in which the cleaning problems are greatly reduced and in which any size range of particles may be successfully handled. Such an overall system forms the subject matter of my copending application Serial No. 241,725, filed of even date.

In general, the separatory process of the present invention is simple. It consists in imparting to a flow of a relatively large volume of medium, a rotary motion such that, in falling through a partially confined space, a vortex or whirlpool is established. A particulate mixture to be treated is introduced onto or into an upper level in this vortex. One flow of fluid from the confined space, normally the principal flow, is by free flow into a central opening. The latter is of such diameter that it normally does not run full of liquid.

This central opening should be above the bottom of the confined space and lead into a conduit. The latter extends from the bottom upwardly into the confined space and with the outer walls of the latter gives the lower part of the confined space an annular horizontal cross-section. The lighter-density fraction, regardless of particle size, is carried into this opening by a weir overflow, falls down the inner walls of the conduit and out of the vessel. At all times then a fixed minimum volume of liquid is present in the lower annular confined space, since some overflow is always maintained. The heavier density particles fall to the bottom of this confined annular space. They are removed therefrom by some suitable means at a level below that of the overflow opening, usually at or near the bottom of the annular space.

Further discussion of the present invention may be more readily followed by reference to the accompanying drawings in which.

Figure 1:
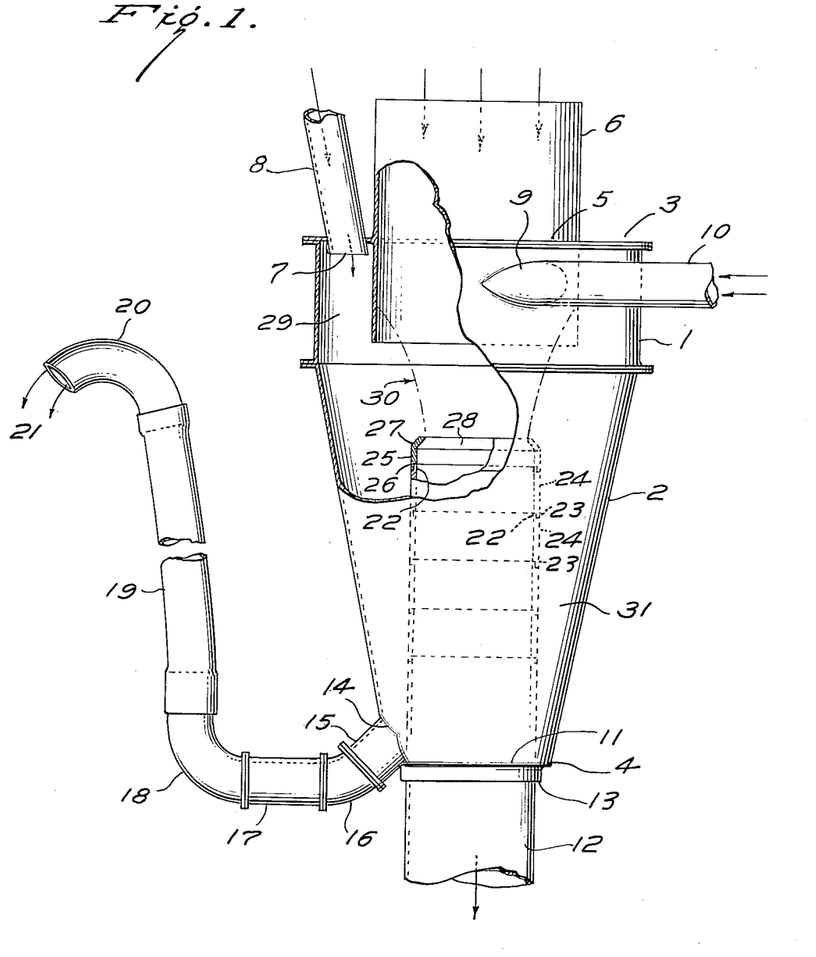
Figure 1 is an elevation, partly in section, showing a separator utilizing the principles of the present invention.

As may be seen from Figure 1, the composite elements of the apparatus are essentially simple. Standard shapes, forms and fittings are available for most of the parts. The remainder may be readily constructed from steel plate by cutting and welding or riveting. This is an important advantage of the invention, in that it eliminates the necessity for any special castings or prefabrications.

As seen in Figure 1, and illustrative apparatus comprises generally an outer shell consisting of an upper cylindrical section 1, mounted on a lower conical section 2. The upper or larger diameter of conical section 2 has substantially the same diameter as the cylindrical section. These sections are caused to enclose a confined space by means of a suitable cover plate 3 and a bottom plate 4. The whole is assembled into a unitary vessel by suitable mechanical means, such as bolting, riveting or welding.

It will be seen that cover plate 3 is pierced by two ports. There is a large central port 5, preferably placed concentrically with the outer shell of cylinder 1. Filling this port 5 and mounted therein by welding, or other mechanically equivalent means, is a cylindrical section 6 open at both ends and extending both above and below cover plate 3. The annular area of cover plate 3 is pierced by a second port 7, usually located as closely as possible to the outer edge of cylinder 1. This port is filled by the lower end of a suitable solids feed chute 8. As shown in Figure 1, chute 8 is circular cross section. This is not an essential limitation, since it may have any suitable cross-sectional shape for the delivery of particulate material to the vessel from the solids storage facilities. The latter being conventional, form no part of the invention and are not shown.

In the side wall of cylinder 1, usually located as high thereon as convenient, is a fluid inlet port 9. Attached to the outer wall of cylinder 1, about the edge of port 9, is a conduit 10. Conduit 10 serves to introduce fluid medium from any conventional storage, cleaning and/or recovery systems. Since these latter form no part of the invention, they are not illustrated. Conduit 10 is usually attached by welding. The tangential position of port 9 shown in Figure 1 while most desirable is not absolutely essential. When not tangentially positioned, other suitable mounting means for conduit 10 such as a screw flange, bolting, riveting, or the like, may be employed.

Bottom 4 of the confining vessel is also pierced by a large central port 11. Filling this port is a large conduit 12, extending from a level within the vessel down through port 11 and below the vessel. Conduit 12 serves as a fluid discharge conduit and, after leaving the vessel, conducts the discharge to any desired location. Conduit 12 is mounted in and fills port 11 by means of a suitable flange 13.

The lower side wall of conical section 2 is pierced by a port 14, preferably located as near the bottom of the confined space as practicable and preferably, but not necessarily, tangentially positioned. About port 14 and attached to the outer face of conical section 2 a discharge conduit 15 extends downwardly and outwardly. Again, it may be attached about the outer edge of port 14 and to the side of the vessel by any suitable means, such as welding or the like. As shown in Figure 1, conduit 15 is attached to a 45° elbow 16 which in turn connects to a short straight section 17 connected to an upwardly-turning 90° elbow 18. Attached to the vertical opening of elbow 18 is a suitable conduit 19. Conduit 19 at its other extremity is joined to a curved pipe 20 for diverting the direction of flow from the open end 21. Preferably, conduit 19 is of some flexible material, such as a rubber hose or the like. The pipe and elbow combination may be substituted by any mechanical equivalent for changing the direction of flow.

For various reasons, it may be desirable during operation to adjust the height to which conduit 12 extends up in the confined space within the vessel. In order to accomplish this, several different expedients may be employed. For example, the outer face of conduit 12 and the inner face of collar 13 may be correspondingly threaded. However, in the larger shapes this is not only inconvenient, but the nature of the material to be handled tends to plug the threads and render them useless. Collar 13 may be equipped with some packing and/or clamping device. These need not close the opening perfectly, since the slurry being handled will promptly close any small leaks. Unfortunately, the latter action also makes any such sliding arrangement exceedingly difficult to adjust.

Perhaps the most useful expedient is shown in Figure 1. The upper outer edge of conduit 12 may be machined to provide a flange 22. Flange 22 should be suitable for engaging for a mating flange 23 on the lower end of the ring section 24. A plurality of rings 24 may be used. These may be provided in different heights for more accurate adjustment, if so desired. The upper edge of ring 24 should be turned to provide a flange like flange 22 for engagement with any additional rings. One further modification is shown. Upper ring section 25 has a mating flange 26 for engagement with any of flanges 22, whether on conduit 12 or one of the rings 24. The upper edge of ring 25, however, is turned upwardly and inwardly as, for example, at 27. In this way, the upper opening 28 of ring 25 has an effective diameter considerably smaller than the diameter of conduit 12.

It is believed that the operation of the apparatus can be readily understood from the description of the structure. Separatory fluid is introduced through conduit 10 and port 9 into annular space 29 between the outer wall of cylinder 6 and inner wall of cylinder 1 in sufficient volume to substantially fill the annular space and the remainder of the vessel. In so doing, a circular laminar flow is set up within annular space 29 and it carries down into the vessel.

The lower section of cylinder 6 acts as a baffle and exerts a compressive force on the fluid flowing around and down in space 29. As the flow passes below the open lower end of cylinder 6, the confining force is released and a considerable volume of liquid rotates upwardly into cylinder 6. However, cylinder 6 being open at both ends, this upward flow stops at an equilibrium height. From this level a vortex of spirally flowing fluid having a profile such as indicated approximately by dotted line 30 will form and extend down into and within the opening 28 at the top of the conduit and ring assembly. Since the inner face of the vortex is within the opening there will be a fluid head or weir over the top edge of this opening. This will be a very appreciable volume of liquid, usually representing the major portion of volume entering through port 9. The remainder of the fluid continues to flow spirally downward in the annular space 31 between the inner face of conical section 2 and the outer face of the central discharge conduit. This fluid fraction passes out through port 14 and its appendant conduits, being carried therethrough and up conduit 19 by the combination of spiral force of the flow and the hydrostatic head within the vessel to some level in equilibrium therewith, at which level it is discharged through open end 21.

In starting operation, sufficient fluid is introduced to fill the vessel and establish the vortex profile. The height of discharge opening 21 is set to adjust the flows in conduits 12 and 19 to an approximation of the correct proportions. Particulate material is sent down chute 8. Within the spiralling laminar flow of fluid in annular space 29 there is movement in many directions. Not only is it around and down, but "rope-like" layers form and spiral around and over each other as the fluid moves as a whole. The combination of centrifugal and centripetal forces exerted in the fluid body as a whole as well as in the multiple twisting layers or "ropes" of fluid, start the density separation. The higher gravity particles move rapidly out to and down the inner face of cylinder 1. The lighter gravity particles tend to move toward the center of the vessel.

As the spiralling flow passes the lower open end of cylinder 6, there is a release of the confining pressure. While still maintaining the circular laminar flow, fluid flows upwardly within cylinder 6. This rise draws a substantial proportion of the fluid in the vessel up into cylinder 6 and carries with it much of the least dense material. This material is drawn to the face of the vortex and passes down into the central discharge opening 28 and into conduit 12. As the spiralling laminarly flowing fluid continues on down through the vessel, more of the less dense particles are drawn to the inner face of the vortex and more of the more dense materials are drawn outwardly toward the inner face of conical section 2.

The height to which the slurry will rise in cylinder 6 will depend on operating conditions. It may and often will go higher than plate 3. In addition, surges on the line can never be entirely obviated. Accordingly, cylinder 6 should extend sufficiently above plate 3 to allow for these possibilities.

The balance of the fluid not flowing by weir overflow into opening 28 passes down into the annular space 31 in the lower part of the vessel. In this space, the spiralling laminar downward flow continues. However, the volume thereof is regulated by the amount of discharge through conduit 19 so that only particles of desired density or higher are carried down into the lower levels of section 31. The remainder passes over the lip of ring 27 into the central opening 28.

Conduit 12 delivers the fluid flowing therethrough to any suitable point. Since this will be a fluids-solids fraction roughly corresponding to the overflow fraction in a conventional sink-and-float operation, this flow is usually delivered to a circuit of some type from which the float-fraction solids may be removed and the medium fluid recovered and/or recleaned and recirculated. The component parts of this circuit form no part of the present invention and are not shown.

Similarly, the fraction discharged through conduit 19 roughly corresponds to the sink fraction of a conventional heavy media separation. Accordingly, it too is usually delivered to some circuit in which the sink solids are separated from the separatory medium and the latter is recovered and recycled for use. This circuit, too, may be conventional and since it forms no part of the invention, it too is not illustrated.

The different density fractions are periodically examined. If their constituents are not in correct proportion for the type feed being introduced, the various flows are adjusted to correct the disproportionation. Ordinarily, the density of the separatory fluid will not be altered in normal operation. Operation will be carried out at the lowest practicable density of separatory fluid and the minor adjustments will be made by regulating the proportions in the discharge flows and/or the volume introduced through conduit 10.

These adjustments are quite flexible and essentially simple. If the heavy fraction, for example, is found to contain an insufficient amount of the desired components and the fluid medium density is approximately the optimum, the heavier solids content can be increased by increasing the flow through conduit 19. This may be done by lowering the discharge opening 21. If this also results in carrying an excessive amount of middlings into conduit 19, it will also be necessary to increase the flow down conduit 12. Accordingly, if necessary, the volume entering through conduit 10 may be proportionately increased. Usually, this will be done. In fact, in some cases, the entire adjustment may be made simply by increasing this input volume.

On the other hand, in some cases all or part of the desired effect may be produced by simply decreasing the flow into opening 28. When this can be done without unduly increasing the total weight of solids carried out into conduit 19, it may be accomplished by adjusting the level of the discharge opening. It may also be accomplished by changing the diameter of the opening by substituting for ring 25 one of more suitable diameter. This proportion may also be influenced to some extent by raising or lowering the bottom level of cylinder 6. However, from a mechanical point of view, this is a much more difficult adjustment, and one to which the response is not necessarily as sharp as those of the previously mentioned adjustments.

One desirable feature of operation has not been discussed. This is in conjunction with the introduction of solid feed. Preferably, feed chute 8, or its mechanical equivalent, is adjusted so that the discharge of the solid material into the annular space 29 is in the approximate direction of the circular flow. Because the separatory action is very fast, this is not essential. However, it is of assistance in insuring a better separation of the materials in the middlings ranges.

In any case, separation of the feed particles at a desired density for any particular feed rate may be brought into adjustment quickly. Once equilibrium is obtained, the apparatus is sufficiently flexible that it will continue to run with very little supervision.

As will be seen from the foregoing discussion, while the processing limitations are simple, they are essentially functional limitations which may be listed as follows. There should be provision for:

(1) Introducing material and separatory fluid into an annular space at the top of a larger confined space;

(2) Releasing the compressive force exerted on the so-introduced fluid by the inner wall of the annular space;

(3) Containing the resultant upward flow after pressure release;

(4) Overflowing slurry from a central area in the confined space and usually at a level below the zone of pressure release;

(5) Sufficient room within the confined space for a vortex to form from the top of the upward flow into the central opening;

(6) Sufficient confined space below the central discharge opening to allow the heavier density fractions to separate and reach the bottom of the space;

(7) Removing the so-accumulated heavier density fraction;

(8) Adjusting the several flows of fluid, i. e., into the vessel, down the central discharge opening and from the lower levels in the confined space;

(9) Introducing particulate material to be treated into the treating liquid, usually preferably into the upper annular space but independently of the fluid introduction.

So long as these functions are maintained in some manner, they may be accomplished by a variety of differing mechanical adaptations. A number of mechanical modifications, each of which has definite advantages in particular situations also have been illustrated in the accompanying drawings.

Figures 2, 3, 4, 5:
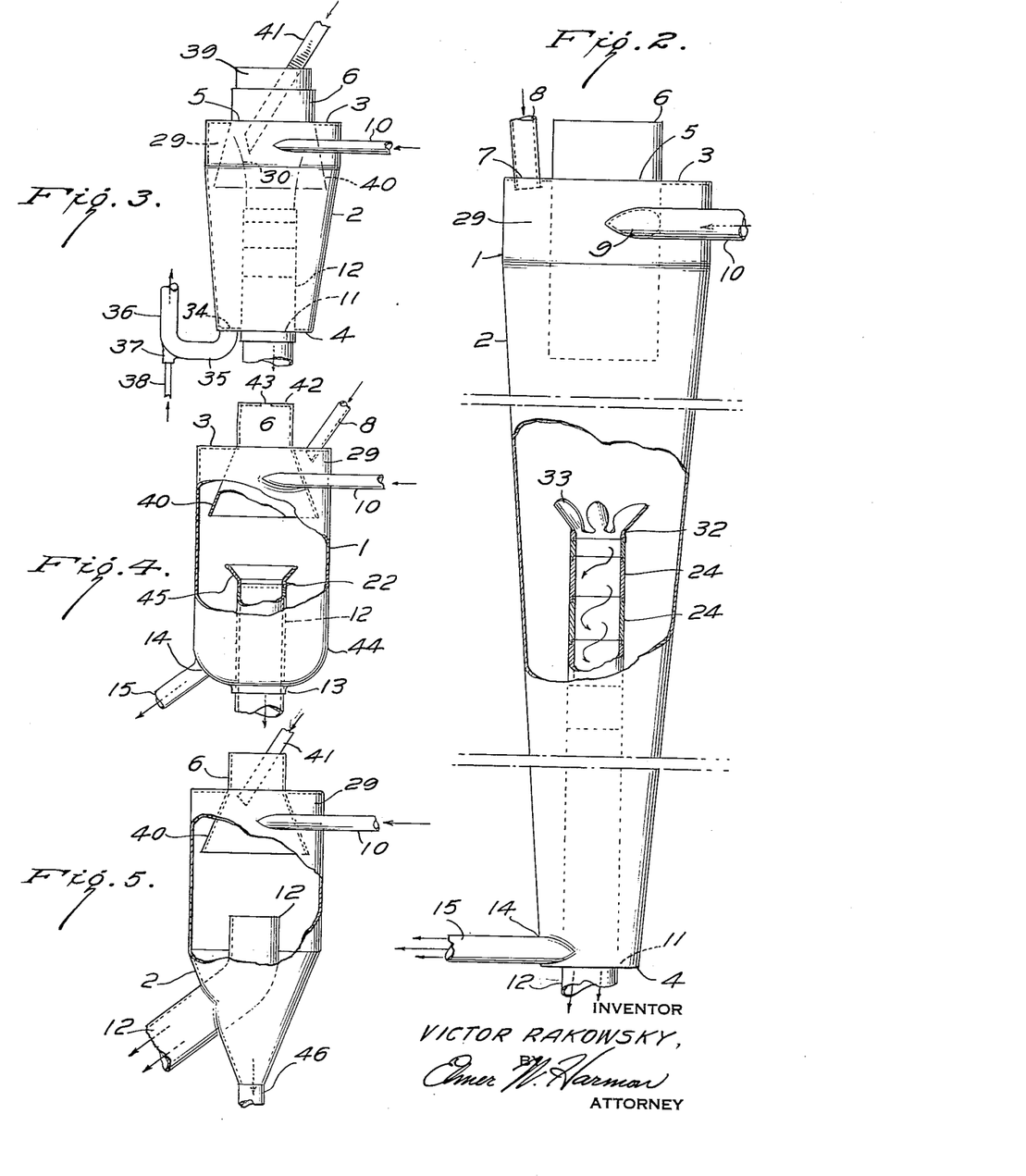
Figure 2 is an additional elevation, also partly in section showing a still further modification particularly suitable for handling small sizes of particles.
Figures 3, 4 and 5 are further elevations, partly in section, showing additional modifications of the invention.

One such modification is shown in Figure 2. It will be seen that the apparatus uses a number of common elements. However, the top adjustment ring 32 shows a special modification. As shown in Figure 2, upper ring 32 carries at its top a plurality of outward flaring cutter plates 33. Such an arrangement is particularly useful for increasing the flow of fluid into the central discharge conduit 12.

Two other distinctions over Figure 1 should be noted. One feature is that the vessel is elongated vertically. Such an elongation is not necessary, but is helpful when treating a solids mixture of or containing a high proportion of relatively small particles. It allows more time for the smaller particles, which move more slowly through the fluid, to become definitely parted either into the central overflow fraction and the outer or heavy fraction.

Another distinction is in the relative positioning of cylinders 1 and 6. In Figure 1, the open bottom end of cylinder 6 was at a level somewhat above the bottom of tubular section 1. In Figure 2, the bottom of cylinder 6 extends downwardly into the pyramidal section 2 for an appreciable distance. In addition to an increase in treating time resulting from this elongation, it will be noted that the conical section 2 is much closer to the bottom of cylinder 6 than was the lower edge of cylinder 1 in Figure 1. Accordingly, fluid in passing down through the annular section 29, which is similar in both Figures 1 and 2, is subjected to an increasing compressive force rather than a uniform one, as in the modification of Figure 1. In many cases, this will be found helpful in increasing the desired degree of separation.

Several additional modifications are shown in Figure 3. In the preceding figures, the heavy fraction discharge has been taken out through an opening in the side of the vessel at a low level. While this is often desirable, it is not essential. In Figure 3, in addition to port 11, bottom plate 4 is pierced by a second port 34, which opens into a discharge conduit 35. Conduit 35 is a return-bend pipe attached to the lower face of plate 4, about the opening port 34 and is intended to carry slurry flowing therein in an upward direction. Concentric with the upper leg 36 of conduit 35, there is on the lower face of the return bend a suitable flange connector 37, through which a small conduit 38 extends into conduit 35. Air is introduced through conduit 38 and converts conduit 35 into an air lift to assist in discharging the material leaving the vessel through port 34.

An additional modification of the general apparatus is shown at the top of the apparatus. Cylinder 6 in Figures 1 and 2 extended above cover plate 3 for sufficient height to allow for the height to which the vortex profile 30 will rise within cylinder 6 which, as was pointed out, may often go above plate 3. For this reason, in Figure 3, cylinder 6, which extends for a distance above plate 3, is provided with an adjustable tubular sleeve 39 mounted therein and which may be raised or lowered, in accordance with the demands of the operating schedule.

Where in Figures 1 and 2, cylinder 6 extended vertically down into the separatory vessel, in Figures 3, 4, 5 and 6 this downward extension has been replaced by a conical baffle or "umbrella" 40. In this way, fluid flowing spirally around and down through annular space 29 is subjected to a constantly increasing compressive force throughout the length of its travel. As noted above in conjunction with Figure 2, this use of a constantly increasing compressive force is of definite assistance in many cases. Particularly is this true in treating mixtures containing high proportions of fines.

One further modification also is shown in Figure 3 in the method of adding the particulate material to be treated. As shown in Figure 3, the feed chute 41 does not pass through a port in cover plate 3, but passes directly downward through the open upper end of sleeve 39 and cylinder 6 to some height at which the solids discharge therefrom will be directly onto the upper surface of the vortex profile 30. Such an arrangement may be desirable for any of a variety of reasons. It is the most simple arrangement which can be set up. When the desired feed rate is high it is difficult to force the feed at a sufficient rate through a chute located as in Figure 1, or to do so without interfering with the laminar flow. It may be desirable also to treat a feed containing very large pieces, usually and primarily of the lighter gravity material. Under such conditions, delivery of the large light material directly onto the surface of the vortex permits it to be carried quickly out of the system without interfering with the treatment of the smaller particles.

In addition, the circular laminar flow in space 29, whether under constantly-increasing compressive force or not, tends to develop density gradients in the medium itself. One gradient is increasing toward the outer wall of the tubular vessel. Where separatory fluid is recycled with a minimum of medium solids cleaning, this gradient is quite noticeable. Accordingly, the inner and upper portions of the vortex 30 usually will be of lower density than the fluid layers nearer the outer walls. By feeding all or part of the solids including these larger particles onto the surface of the vortex, as in Figure 3, an operation is assured in which the heavier particles will penetrate into the fluid quickly and for an appreciable distance and the lightest particles will be substantially wholly retained at or near the surface and passed quickly and surely into the central overflow opening.

Several additional modifications are illustrated in Figure 4. Again the conical baffle 40 is used to increase the rotational forces and velocity in space 29. Again as noted, this is particularly useful in the treatment of finer-sized particles. For such purposes, the feed will usually be into the annular space 29, both for solids and separatory fluid. Since no central feed chute 41 is used, cylinder 6, extending only above the plate 3, is itself closed by a circular plate 42 to prevent possible splashing during line surges. Since it is necessary for the formation and maintenance of a useful vortex, that the space within cylinder 6 and baffle 40 be freely vented, plate 42 is provided with one or more vent holes 43.

As shown in Figure 4, the vessel is essentially tubular in shape. Upper tubular section 1 is extended nearly to the bottom. Conical section 2 and bottom plate 4 of the previous modifications, are in Figure 4 replaced by a bowl shaped segment 44. This is a useful modification when the use of additional compressive force in the lower part of the vessel is not essential or where there is a high proportion of large sizes in the heavy fraction which settles down into the annular zone at the bottom of the vessel. Port 14 and conduit 15 lead through the bowl segment 44 in a manner similar to that employed in Figures 1 and 2, being essentially tangential in location and their respective conduits being mounted about the ports as by welding or the like.

The central conduit for discharging the lighter fraction in Figure 4 is equipped with a special top ring 45. This is useful when it is desired to increase the effective inlet opening of the central discharge conduit. It will be seen that the bottom of ring 45 is formed as by machining, to engage with the flange 22 of conduit 12. Instead of ascending vertically, however, its side walls flare outwardly and upwardly. This modification is useful when it is desired for operational purposes to increase the total central discharge.

A somewhat different structure is shown in Figure 5. In this modification, the central discharge conduit 12, instead of passing directly through the bottom of the vessel, is turned within the vessel and passes out through a side thereof. As shown in Figure 5, it passes through the lower pyramidal section 2. In this case, the heavy fraction discharge is directly through port 46 in the bottom of the vessel.

Figures 6, 7:
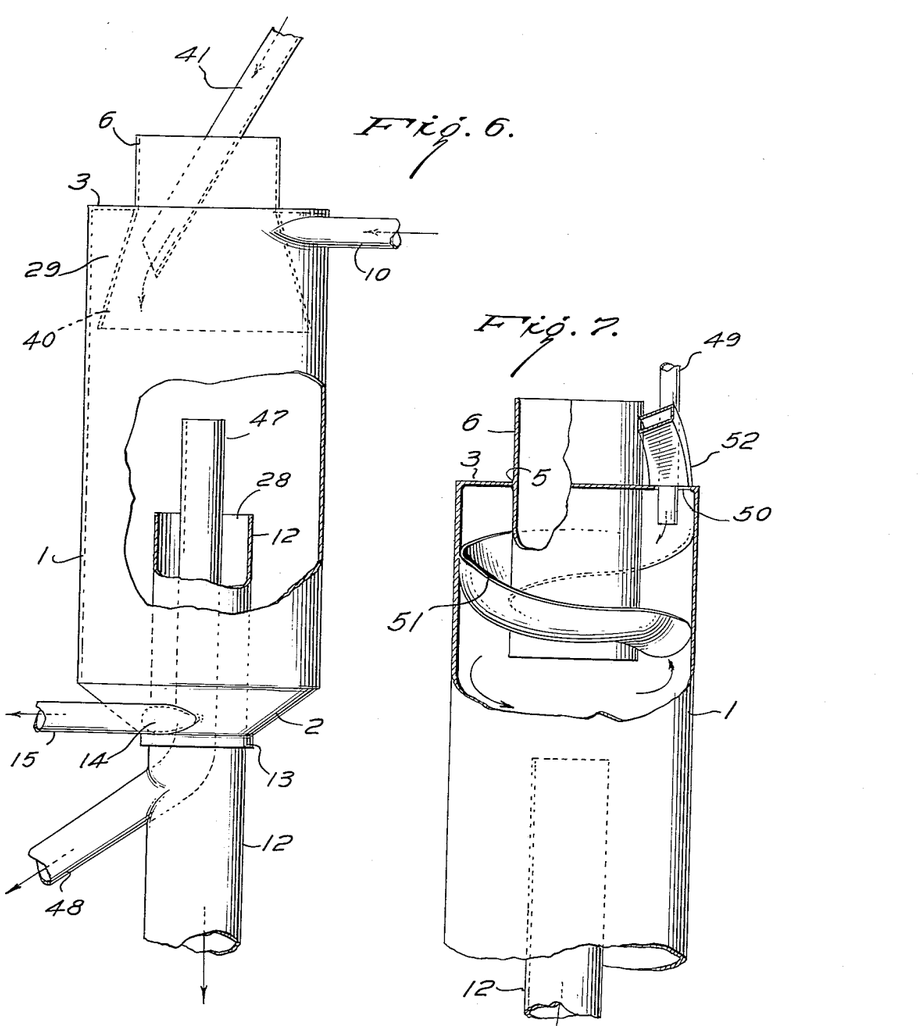
Figure 6 is an elevation, partly in section, of a modification adapted for taking off a plurality of density fractions.
Figure 7 is an elevation, partly in section, showing a modification of the feed means for the separatory fluid and the particulate feed means.

A still further modification is shown in Figure 6. In some cases, there are appreciable quantities of middlings in the solids to be treated. These are particles having average density so closely approximating the density at which separation is desired that longer time is required for them to become definitely classified as being in one fraction or the other. In the past, such material has usually been allowed to pass either into the light or the heavy fraction. If necessary, or if desirable, the fraction containing the majority of this material may be retreated at different parting density. In the modification shown in Figure 6, this effect can be obtained by treating such mixtures in a single pass through one unit.

In Figure 6, the upper cylindrical tubular section 1 is of somewhat different contour than in the other modifications shown. It is elongated, and the elongated conical frustrum at the bottom has been greatly shortened to correspond therewith. At the bottom or smaller diameter of the frustrum, a collar 13 corresponding to collar 13 in Figure 1 has been provided for central discharge conduit 12. The heavy fraction discharge is, as in Figure 1, taken through a tangential port 14, opening into a conduit 15 at the lower bottom side of the pyramidal frustrum 2. A central feed chute 41 and the conical baffle 40 is used as in Figures 3 and 5.

A distinct departure from the other modifications is in the inclusion of an additional central discharge conduit. Conduit 47 extends from a height somewhat above the upper end of the normal central discharge opening 28 into conduit 12, and concentrically down through conduit 12 to some level usually below collar 13, at which point it is bent and carried out through the side of conduit 12, as an additional discharge conduit 48.

The operating advantages of the modification are believed to be clear from the drawing. The normal light density fraction is carried down through the central conduit 47 and thence downwardly to the discharge from conduit 48. The normal heavier-density fraction is discharged, as in the other modifications, through conduit 15. Conduit 47, however, receives and discharges the middlings solids fraction of an average density approximating that of the parting density. By this arrangement, an effective three-way separation may be accomplished.

The modification illustrated in Figure 7 is particularly adaptable when space is a limiting factor. This modification which, in substance, is similar to that of Figure 3, with the exceptions of the location of the feed means for separatory fluid and particulate material, shows modifications of these latter. Separatory fluid is introduced into the main chamber through a large conduit 49 which, instead of entering through the side of the cylindrical section 1, passes downwardly through a port 50 in the annular area of cover plate 3. The same central port 5, as shown in Figure 2, is used with the cylindrical baffle section 6 mounted therein and extending above and below the level of top plate 3.

In order to immediately create the circular laminar flow, a spiral baffle 51 is mounted within tubular section 1, extending from a level immediately below the lower end of conduit 49 and turning horizontally and spirally around the lower length of conduit 6. By this arrangement, the overall structure may be confined to a much smaller floor space than that required for the modification of Figure 2, for example. After the operational flow has been established, the particulate material to be treated is introduced through curving chute 52 leading from a higher rock storage bin. Alternatively, but not shown, the particulate material and fluid may be fed through the same chute or conduit. The feed chute, as in the other modifications, should be so positioned as to deliver the particulate material in the general direction of the fluid movement.

From the foregoing discussion, it can be seen that except within rather wide limits, the present invention is not necessarily restricted by structural limitations. The size and shape of the overall unit may be quite widely varied. It may be adjusted in accordance with differing demands. Therefore, both the process limitations, discussed above, and the necessary apparatus therefore are sufficiently flexible in design and use to be adaptable to many differing situations.

While a number of apparatus variations have been discussed in conjunction with the drawings, it will be seen that, like the process limitations, all of the units contain similar means for performing similar functional operations. For example, there must be a closed space chamber within a suitable shell. In the modifications shown, this has been indicated as circular in cross-section for uniform circular motion. However, it is not essential. Any tubular shape may replace the cylindrical section. Any pyramidal shape may replace the lower conical section. For example, a six, eight, twelve or more sided tube or pyramid may be constructed from sheet material by welding for use where suitable circular sections are not available.

The enclosed separatory space should be further fitted to the situation. In the upper part of the shell, there must be some provision, preferably tangential, for introducing separatory fluid. The top of the enclosed space, into which the fluid is introduced, should be an annular space of appreciably smaller cross-section than the main chamber at the same level. Preferably, the baffle which, with the outer shell and cover plate forms this annular space, should be conical or pyramidal, flaring downwardly and outwardly within the vessel from the smallest diameter at the cover plate. A tubular shell having substantially the same inner diameter as the large central hole in the cover plate about which the lower baffle is attached, should extend upwardly from the cover plate for an appreciable distance. In addition to the fluid feeding means, there must be means for introducing the particulate material, either near the top of the enclosed space or close to the inner surface of the downwardly extending baffle. If so desired, both may be used although this has not been shown.

There must be at least one vortex discharge conduit within the enclosed space above the bottom of the vessel and preferably centrally located. There may be a plurality of such discharge conduits. If so, they too should be concentrically positioned. Preferably, for flexibility in use, the height or heights of the central conduit or conduits should be adjustable in some manner. The effective opening into these conduits should preferably be adjustable also.

Discharge of the heavy fraction at or near the bottom of the vessel must be provided for. Generally at or very near the bottom of the vessel, there is an opening, either in the bottom or the side wall adjacent thereto. This opening leads directly into a suitable discharge conduit. This latter should be adapted by some means for the control of the flow volume therethrough. This control can be arranged for in several manners. For example, the hydrostatic head within the vessel may be used to operate a siphon discharge, as shown in Figure 1. This may be regulated by raising or lowering the discharge end. Where so preferred, an air lift may be employed, as shown in Figure 3. If the heavy fraction includes very large or very heavy pieces, their removal may be assisted by a conventional mechanical screw, drag or the like. However, in most cases, the capacity of the vessel is so great for its size, and the rotation of liquid is sufficiently rapid that such equipment is not necessary, nor, in most cases, will there be sufficient room to install such ancillary equipment.

In the practice of the present invention, several definite advantages are obtained. In the foregoing discussion, it was pointed out that a density gradient in the separatory fluid tends to develop between the center of the vessel and the outer wall. In addition, a density gradient develops from the top to the bottom of the vessel, perhaps due to considerable extent to the increasing accumulation of heavier particles at the lower levels. As a result of this gradient and the forces exerted by the spiral flow, it is possible to accomplish separation of the particulate mixture into fractions at an apparent parting specific gravity higher than the density of the incoming separatory fluid. For example, the actual gravity of separation may vary from about 0.05–0.5 above the density of the separatory fluid at the feed inlet.

This ability of the present invention to operate at a parting separation density above that of the fluid offers several other advantages. In some cases, the medium may be prepared from more economical but less dense medium solids, than can a separatory fluid of the necessary gravity for use in a conventional static cone separation. On the other hand, it may be used simply to reduce the necessary amount of medium solids in circulation.

Where a magnetic cleaning system is used to recover media solids, it makes little difference whether demagnetization is done or not. The magnetic aggregates will be broken by the operation of the forces exerted during use since the latter appear to be considerably greater than the magnetic attraction of the ferro particles.

Perhaps even more important, it permits use of coarser medium solids than would be suitable for conventional operations. If the fluid medium is made up of coarser solids, its viscosity is lower and the sharpness of separation is increased due to decreased resistance to the passage of particles through the moving layers of separatory fluid. At the expense of some loss of sharpness of separation, use of coarser media can be advantageously employed to cut down on the necessary amount of medium cleaning. Larger amounts of small-sized particles or slimes may be tolerated in the recycled medium without the viscosity becoming excessive than is possible using finer media solids.

The same phenomena that permit operation at separation densities above that of the fluid, produces some thickening of the heavy fraction. Slimes and fines, therefore, preponderantly pass with the lighter density fraction. Accordingly, the whole of the heavy fraction drainage medium can be directly recycled in many cases without any further cleaning. Of the light fraction drainings and washings, and the heavy fraction washings, only a minimum volume must be sent to the medium-solids cleaning and recovery system. Where the fluid medium contains only the permissible coarser media solids considerable amounts of the light fraction drainings and, in some cases, even some of the washings may be directly recycled as diluent liquid because of the above-noted greater tolerance for slimes and fines. Because the media solids used are coarser than for normal operation of previously known procedures, a large part of the solids may be quickly recovered simply by thickening without the necessity for passing the entire fraction to be cleaned through complete cleaning. When a magnetic cleaning system is used, this is an appreciable advantage in that it reduces the investment in ancillary equipment. Not only can a larger fraction be recycled, but because of the quicker settling rates of the coarser media solids, a decanted fraction from simple settling will contain only water, slimes and valueless fines and may be directly discharged without ever having to pass through the magnetic cleaning system.

In operating the process of the present invention, one feature should be noted. Contrary to practice in cyclonic systems, where high velocities must be maintained sufficiently to produce an inverted vortex, no such practice enters in the present operation. High pressures are not necessary. In operating the process of the present invention, the volume of flow is more important than is its pressure. As noted above, certain volumes are required for various discharge conduits to maintain separation. So long as this total volume is delivered to the unit, the pressure at which it is delivered is relatively unimportant.

Moreover, the process of the present invention as compared with cyclonic systems, for example, is relatively free from sensitivity to surges which alter the flow conditions. For example, in running a test operation in cleaning coal, perfect separation was obtained even during changes as much as 3:1 in the throughput fluid volume. On the other hand, a cyclonic type separator, compared in use for the same cleaning and necessarily operating at higher pressures, began to lose efficiency on as little as an 8:5 pressure drop, losing its vortex and dropping badly on a 2:1 change. In this case the pressure is a measure of the flow input.

For purposes of comparison of the efficiency of the present invention with previously comparable operations, several facts should be noted. As compared with a static system, units of 2-4 feet in diameter have treating capacities equal to static cones ranging from 10-20 feet in diameter. If the necessary flow of fluid is maintained, separation is so sharp and quick that the apparatus size is almost irrelevant, except as noted above, when there is a very high preponderance of very small material. The rate of flow required to maintain operation in the present separator is of the order of magnitude of about the amount of return fluid introduced into a static cone, of substantially equal treating capacity. It may be even less in some cases. There is, therefore, no necessity for maintaining either a high pressure or a high volume circuit, as in a cyclonic type separator. The resultant saving in ancillary equipment and medium solids inventory are very appreciable.

For the size of a particular installation, the treating capacity of the present invention is tremendous. For example, using a small test model, about 10" diameter and 12" high, having a 4" sleeve extending about 4" down into the vessel and 6" above the vessel, a 1" fluid inlet pipe through the side wall of the vessel near the top, a 2" central discharge opening about 3" above the bottom of the vessel and a ¾" heavy discharge opening, very effective separations were made on —½" ore, using separatory fluid at about 2.6 specific gravity supplied at 6 pounds' pressure. Perfect separation was obtained at a parting density of about 2.75. Rates of feed up to as high as 1200 pounds of ore per hour could be handled. In a larger apparatus, about six feet high by four feet in diameter, with 8" discharge pipes in both lower openings, using a medium at specific gravity 2.85, 30-150 tons of minus two inch, plus ³⁄₁₆" rock per hour are easily handled. Where facilities are available for handling even larger volumes of fluid flow through the apparatus, even greater rates of solids mixture feed can be handled.

EXAMPLE 1

As illustrative of the possibilities of the invention, the following tests on a minus ⅜ inch plus 10 mesh fraction of zinc ore, having an average zinc assay of 5.7% are given. A cylindrical closed-top test vessel about 17 inches high by ten inches in diameter with a bowl-shaped bottom was used. It had a 1¼ inch medium inlet pipe about 16 inches above the bottom and a 1¼ inch conduit for both central and bottom discharge, with the central discharge conduit extending about eight inches up from the bottom. The central discharge was by vertical free fall and the bottom discharge through a gooseneck siphon. The medium solids were about 25% magnetite and 75% ferrosilicon and medium densities were used. Illustrative results are shown in the following table:

Table I

| Test | Lbs. Ore/Hour | Inlet Medium Density | Specific Gravity Float | Specific Gravity Sink | Percent Wt. | Percent Zinc | Percent Dist. Zinc |
|---|---|---|---|---|---|---|---|
| A | 240 | 2.83 | 2.72 | 2.89 | 26.8 / 73.2 | 18.47 / 0.66 | 91.2 conc. / 8.8 tail. |
| B | 200 | 2.78 | 2.67 | 2.89 | 41.5 / 58.5 | 13.22 / 0.27 | 97.2 conc. / 2.8 tail. |
| C | 500 | 2.78 | 2.67 | 2.89 | 49.2 / 50.8 | 11.37 / 0.36 | 96.9 conc. / 3.1 tail. |
| D | 250 | 2.74 | 2.57 | 2.83 | 58.2 / 41.8 | 9.80 / 0.27 | 98.1 conc. / 1.9 tail. |
| E | 250 | 2.70 | 2.53 | 2.80 | 66.8 / 33.2 | 8.53 / 0.23 | 98.6 conc. / 1.4 tail. |

As will be seen from the foregoing illustrations, the procedure to be used will depend to a large extent on the results desired. If it is desired to discard considerable bulk, producing a high grade concentrate, a procedure such as used in test A will be used. If the metal losses are of greater importance and a minimum metal loss in the tailing is desirable, a procedure such as that in test E produces excellent results. A comparison of tests B and C shows the flexibility of the feed rates. Doubling the rate of feed increased the zinc loss in the tailing only from 0.27 to 0.36 by weight.

EXAMPLE 2

A similar test using a similar vessel but having two inch central and bottom discharge conduits was conducted on a low-grade dump ore containing galena in a limestone gangue and assaying about 1.04% average lead. Using a magnetite medium the following illustrative results were obtained.

Table II

| Test | Density | Separation Gravity | Specific Gravity Float | Specific Gravity Sink | Percent Wt. | Percent Lead | Percent Dist. Lead |
|---|---|---|---|---|---|---|---|
| F | 2.58 | 2.65 | 2.48 | 2.63 | 30.0 / 70.0 | 3.24 / 0.12 | 92.0 conc. / 8.0 tail. |
| G | 2.49 | 2.55 | 2.44 | 2.50 | 45.8 / 54.2 | 2.13 / 0.116 | 93.9 conc. / 6.1 tail. |
| H | 2.49 | 2.50 | 2.41 | 2.57 | 55.9 / 44.1 | 1.59 / 0.08 | 96.2 conc. / 3.8 tail. |

These results may be directly compared with a static cone heavy media using a separatory medium containing about 75% ferrosilicon with about 25% magnetite separation on the same ore shown in the following table.

Table III

| Test | Sp. Gr. | Percent Wt. | Percent Lead | Percent Dist. Lead |
|---|---|---|---|---|
| I | 2.65 | 100 / 31.1 / 68.9 | 1.04 / 3.02 / 0.14 | 100.0 Feed. / 90.7 Conc. / 9.3 Tail. |
| J | 2.55 | 46.5 / 53.5 | 2.10 / 0.11 | 94.3 Conc. / 5.7 Tail. |
| K | 2.50 | 56.6 / 43.4 | 1.77 / 0.08 | 96.6 Conc. / 3.4 Tail. |

It will be seen that tests F—I, G—J and H—K are directly comparable. However, in tests F, G and H the result was obtained using magnetite alone, whereas in tests I, J and K in normal heavy-media separation required the use of ferrosilicon to obtain the same result.

I claim:

1. A method of separating mixtures of particulate materials into fractions of differing average specific gravities, respectively higher and lower than a selected parting gravity, which comprises: causing a fluid of predetermined density, approximating but slightly less than the parting density, to flow into and spirally around and down within an upper horizontally confined top enclosed annular space and into a lower horizontally confined space of larger cross-section, at sufficient angular velocity to create an open free vortex extending from within the open vented center of the annular space down into the larger space; discharging a substantial volume of said fluid, comprising the flow concentric with and including the vortex center, downwardly and out of the confined space of larger cross-section; causing said remaining flow to continue around and down within such space; discharging said remaining flow from said confined space at a level below the central vortex discharge; introducing a particulate material mixture into a fluid at a level above said vortex discharge whereby the particles are separated, the major portion of said lower gravity particles being carried into said central vortex discharge; adjusting and maintaining the volume of fluid discharge from the lower level to remove all the solids falling below the central vortex discharge; and adjusting the volume of incoming fluid to produce a rate of overflow into the central discharge which, for the rate of feeding of particulate materials, will carry a major portion of all the particulate material of less than the selected parting gravity into said central vortex discharge.

2. A method as in claim 1 wherein the particulate material mixture is introduced into an upper level of said free vortex and near the surface thereof within the central opening of the upper confined annular space.

3. A method as in claim 1 wherein the particulate material mixture is introduced into the spiral flow of fluid and near the surface thereof within the upper annular confined space.

4. A device for separating mixtures of particulate solid materials into fractions of differing average densities, respectively heavier and lighter than a selected parting density, which device comprises: a first tubular element defining a horizontally confined space, said element having a top enclosing means; a second tubular element having both ends open for communication therethrough extending from without and downwardly through said top enclosing means and having one end terminating at the horizontal center and at an intermediate level of the confined space, said first and second tubular elements defining an upper annular zone; a conduit opening into said annular zone for introducing fluid medium thereto; means for feeding into an upper level of said confined space a mixture of particulate material to be separated; a third tubular element extending from without and upwardly into the confined space, said third tubular element having one end thereof open to said confined space at the horizontal center and at an intermediate level thereof but spaced from said one end of said second tubular element, and adjusted for discharging therefrom the fraction of average lighter density along with part of the fluid, said first and third tubular elements defining a lower annular zone, and a conduit communicating with said lower annular zone at a lower level thereof for discharging from said confined space the remaining fraction of fluid medium and solids.

5. A device for separating mixtures of particulate materials into fractions of differing average densities, respectively heavier and lighter than a selected parting density, which device comprises: a first tubular element defining a confined space, said element having top and bottom enclosing means; a second tubular element having both ends open for communication therethrough extending from without and downwardly through said top enclosing means and having one end terminating at the horizontal center and at an intermediate level of the confined space, said first and second tubular elements defining an upper annular zone; a conduit opening tangentially ito said annular zone for introducing fluid medium thereto and having associated therewith means for regulating the flow of said fluid medium; means for feeding into an upper level of said confined space a mixture of particulate material to be separated, means for controlling the rate of feed of said mixture; a third tubular element extending from without and upwardly through said bottom enclosing means and having one end thereof open to said confined space at the horizontal center and at an intermediate level thereof, but spaced from said one end of said second tubular element, and adapted for discharging therefrom fluid medium and the solid fraction of lighter average density; said first and third tubular elements defining a lower annular zone, a conduit communicating therewith at a lower level thereof for discharging from said confined space the remaining fraction of fluid and solids, and means associated with said conduit for controlling the rate of discharge through said conduit.

6. A device as in claim 5 in which the first and second tubular elements are in such relation to each other that the annular zone defined thereby is of constant cross sectional area at all points.

7. A device as in claim 5 in which the first and second tubular elements are in such relation to each other that the annular zone defined thereby is of progressively decreasing cross sectional area from the top enclosing means downwardly.

8. A device as in claim 5 in which the third tubular element consists of a plurality of detachable tubular sections whereby the level of the open end within the confined space may be varied.

9. A device as in claim 8 in which the uppermost tubular section of said third tubular element presents an open end to the confined space greater in cross sectional area than at any other point in the remainder of said tubular element.

10. A device as in claim 8 in which the uppermost tubular section of said third tubular element presents an open end to the confined space smaller in cross sectional area than at any other point in the remainder of said tubular element.

References Cited in the file of this patent

UNITED STATES PATENTS

| | | |
|---|---|---|
| 1,301,544 | Crombie | Apr. 22, 1919 |
| 1,825,157 | Pardee | Sept. 29, 1931 |
| 2,109,234 | Keenan | Feb. 22, 1938 |
| 2,538,870 | Hunter | Jan. 23, 1951 |
| 2,543,689 | Driessen et al. | Feb. 27, 1951 |